(12) United States Patent
Nakae

(10) Patent No.: US 6,892,543 B2
(45) Date of Patent: May 17, 2005

(54) GAS TURBINE COMBUSTOR AND COMBUSTION CONTROL METHOD THEREOF

(75) Inventor: Tomoyoshi Nakae, Komaki (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 42 days.

(21) Appl. No.: 10/436,272

(22) Filed: May 13, 2003

(65) Prior Publication Data
US 2004/0020209 A1 Feb. 5, 2004

(30) Foreign Application Priority Data
May 14, 2002 (JP) .......................................... 2002-138348

(51) Int. Cl.[7] ................................................... F02C 9/16
(52) U.S. Cl. ......................................... 60/773; 60/39.23
(58) Field of Search ............................... 60/773, 39.23, 60/752, 794

(56) References Cited

U.S. PATENT DOCUMENTS 3,899,881 A * 8/1975 Arvin et al. .............. 60/39.23
3,958,413 A * 5/1976 Cornelius et al. ............. 60/778
6,199,364 B1 * 3/2001 Kendall et al. ................ 60/776
6,449,956 B1 * 9/2002 Kolman et al. ............... 60/777

FOREIGN PATENT DOCUMENTS

JP          61-282682          12/1986

* cited by examiner

Primary Examiner—Ehud Gartenberg
(74) Attorney, Agent, or Firm—Wenderoth, Lind & Ponack, L.L.P.

(57) ABSTRACT

A gas turbine combustor that controls flow rate of air flowing into a primary combustion zone for controlling a local fuel-air ratio comprises no sliding portion that is liable to cause sticking or biting of components operating in high temperature, thereby providing a simple, reliable and efficient combustor and a combustion control method thereof. The gas turbine combustor comprising a liner provided in a combustor case and a bypass duct provided in the liner and enabling a control of flow rate of air supplied into a primary combustion zone via a swirler by causing a portion of the air to pass through the bypass duct, further comprises a float, made of a magnetic substance, provided in the bypass duct so as to open and close the bypass duct by the position of movement of the float and an electromagnetic coil provided outside of the combustor case corresponding to the position of the float so as to move the float.

8 Claims, 4 Drawing Sheets

GAS TURBINE COMBUSTOR AND COMBUSTION CONTROL METHOD THEREOF

BACKGROUND OF THE INVENTION

1. Field of the Invention

The present invention relates to a gas turbine combustor of a low NOx (nitrogen oxide) emission type and a combustion control method thereof of a gas turbine including a jet engine, an industrial gas turbine or the like.

2. Description of the Prior Art

FIG. 3 is an explanatory view showing a schematic structure of a prior art gas turbine combustor of a low NOx emission type.

In FIG. 3, numeral 1 designates a combustor case and numeral 2 designates a diffuser, through which supplied air pressure is recovered and flow distortion is decreased. Numeral 3 designates a fuel injector, numeral 4 designates a swirler, that swirls the inflow air and numeral 5 designates a liner, in which dilution port(s) 6 and cooling slits 7 are provided.

Numeral 8 designates a bypass duct, that is provided in the liner 5. The air that has passed through the bypass duct 8 is not supplied into a primary combustion zone 9, that is shown being surrounded by a broken line in FIG. 3, but is led to a combustor outlet. This means that the more air that passes through the bypass duct 8, the less air that is supplied into the primary combustion zone 9 via the swirler 4.

Numeral 10 designates a bypass duct variable valve, that is provided in the bypass duct 8. An actuator 11 is provided on the outside of the combustor case 1 and the bypass duct variable valve 10 is operated by the actuator 11 so as to open and close the bypass duct 8.

Thus, by operating the actuator 11, quantity of the air to be supplied into the primary combustion zone 9 via the swirler 4 can be adjusted.

In the prior art gas turbine combustor constructed as mentioned above, if a gas turbine operation condition (including load condition) is decided, the NOx emission quantity is decided by a local fuel-air ratio (or local equivalent ratio) in the primary combustion zone 9. The local fuel-air ratio is decided by the ratio of flow rate of fuel injected from the fuel injector 3 to flow rate of air supplied through the swirler 4.

FIG. 4 is a performance curve showing a relation between the local fuel-air ratio in the primary combustion zone and the NOx emission quantity.

As understood from FIG. 4, if the local fuel-air ratio is reduced, the NOx emission quantity can be reduced. But if the local fuel-air ratio is reduced beyond a limiting value, flames come within a blow-off area as shown by hatching and there arises a problem in that the combustion efficiency lowers or blow-out is caused. Hence, in order to reduce the NOx emission quantity, the local fuel-air ratio is usually reduced to within the range that causes no such problem.

That is, in the prior art, control of the local fuel-air ratio is done such that the actuator 11 is operated to thereby operate the bypass duct variable valve 10 so as to control the air quantity to be supplied into the primary combustion zone 9 via the swirler 4. However, the combustor case 1 is usually heated to about 600° C. and the liner 5 to about 900° C. and hence sliding portions of the components of the air quantity control mechanism that operate in such high temperature portions are liable to cause sticking, biting, etc., which often leads to a large damage to the reliability of the design of the device.

Also, in the portion where the actuator 11 is provided passing through the combustor case 1, there is inevitably provided a clearance to some extent. Hence, high pressure air leaks therethrough and there arises a problem that the efficiency lowers to that extent.

SUMMARY OF THE INVENTION

In order to solve the problems in the prior art as mentioned above, it is an object of the present invention to provide a gas turbine combustor and a combustion control method thereof in which there is provided no such sliding portion as easily causes sticking, biting, etc. in the components of the air quantity control mechanism that operate in the high temperature portion and flow rate of air supplied into the primary combustion zone via the swirler can be adjusted so as to effectively control the local fuel-air ratio to thereby realize a simple structure, a high reliability and a high efficiency.

In order to achieve the abovementioned object, a first aspect of the invention provides a gas turbine combustor comprising a liner provided in a combustor case and a bypass duct provided in the liner and being constructed so as to enable a control of flow rate of air supplied into a primary combustion zone via a swirler by causing a portion of the air to pass through the bypass duct. A float, made of a magnetic substance, is provided in the bypass duct so as to open and close the bypass duct by the position of movement of the float. An electromagnetic coil is provided outside of the combustor case corresponding to the position of the float so as to move the float. In this gas turbine combustor, there is provided no sliding portion in the air flow rate control mechanism that operates at high temperature. Thus, there is caused no sticking or biting of the components and an efficient, highly responsive and reliable combustor can be realized.

Also, a second aspect of the invention provides a gas turbine combustor as mentioned above, wherein a float guide guides the float and a stopper, on which the float abuts, is provided at a lower end of the float guide. Thereby, the opening and closing mechanism of the bypass duct can be manufactured less costly with a simple construction.

Also, a third aspect of the invention provides a combustion control method of a gas turbine combustor as mentioned above, wherein characterized in that the position of movement of the float is changed by the electromagnetic coil and the portion of the air is caused to pass through the bypass duct corresponding to the position of movement of the float, so that the flow rate of the air supplied into the primary combustion zone via the swirler is controlled and a local fuel-air ratio in the primary combustion zone is controlled. Thereby, the NOx emission quantity can be effectively reduced and an efficient and reliable combustion control can be achieved.

DESCRIPTION OF THE PREFERRED EMBODIMENTS

The invention will be described more concretely based on an embodiment of a gas turbine combustor and a combustion control method thereof of the present invention with reference to FIGS. 1 and 2.

Figure 1:
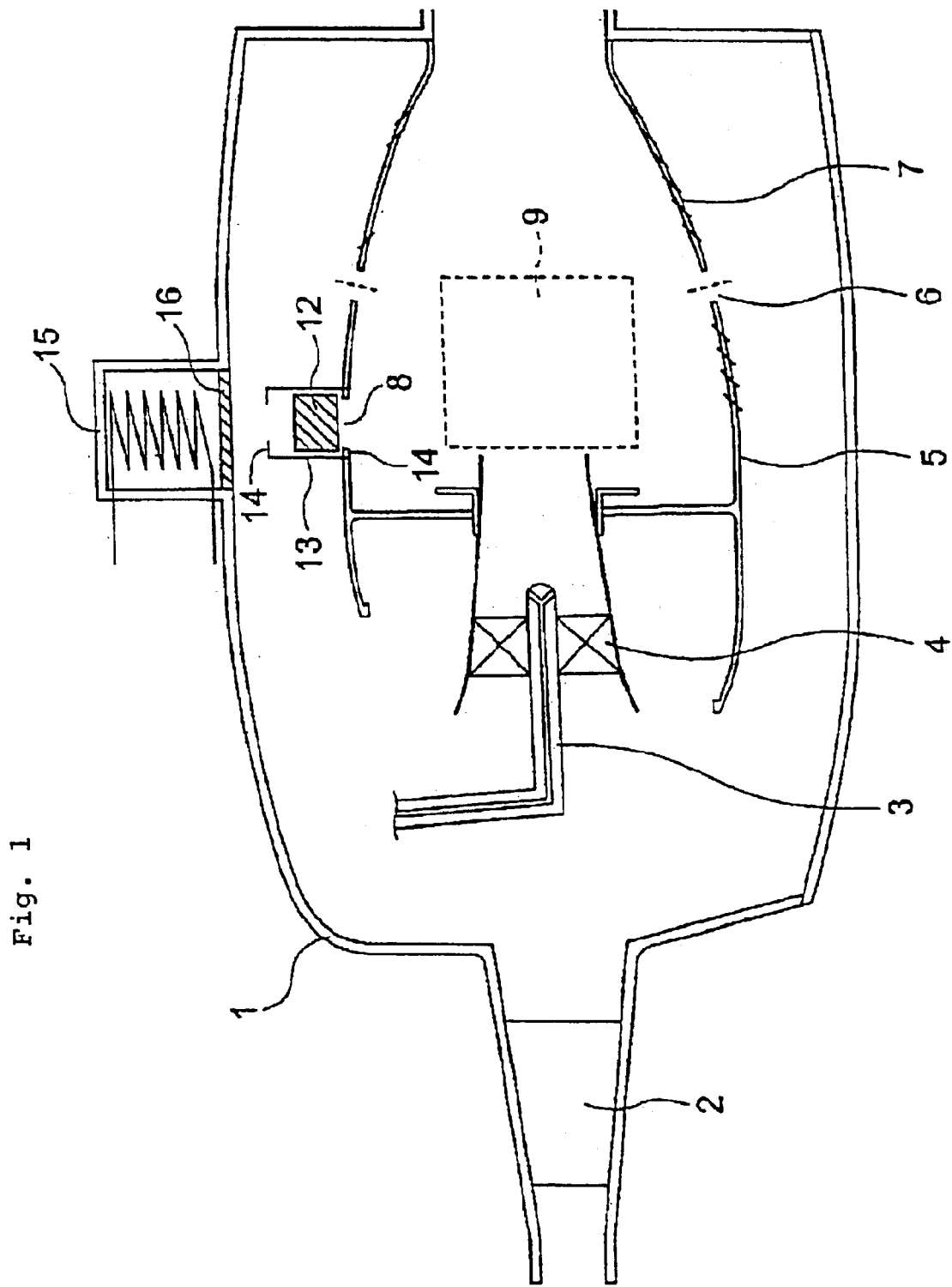
FIG. 1 is an explanatory view showing a schematic structure of a gas turbine combustor of an embodiment according to the present invention.
Figure 3:
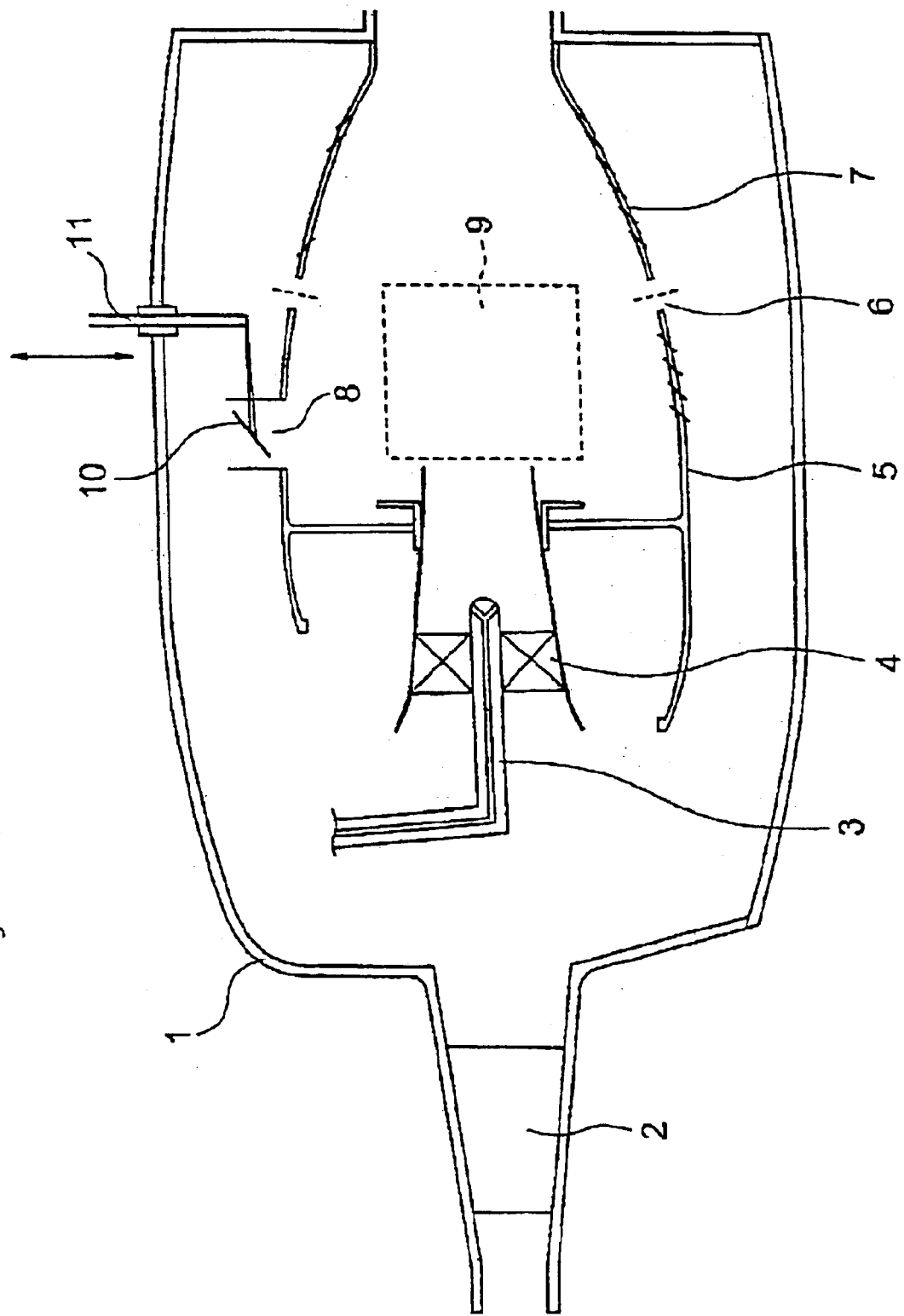
FIG. 3 is an explanatory view showing a schematic structure of a prior art gas turbine combustor of a low NOx emission type.

FIG. 1 is an explanatory view showing a schematic structure of a gas turbine combustor of the embodiment according to the present invention. In FIG. 1, the same components as those of the prior art gas turbine combustor shown in FIG. 3 are denoted with the same reference numerals and a repeated description thereon will be omitted.

In FIG. 1, numeral 12 designates a float, that is made of a magnetic substance so as to float and move by magnetic force. The bypass duct 8 is constructed so as to open and close by the position of movement of the float 12.

Numeral 13 designates a float guide, that guides the movement of the float 12. The float guide 13 is formed in a cylindrical shape and, at each of upper and lower ends thereof, has a stopper 14 on which the float 12 abuts to stop. It is to be noted that the stopper 14 at the lower end of the float guide 13 is not necessarily provided by the float guide 13 but it may be provided by an inner periphery of a hole provided to form the bypass duct 8 in the wall of the liner 5.

In a circumferential wall of the float guide 13, there is provided an opening for air to be supplied into the bypass duct 8. An air quantity corresponding to the position of the float 12 is supplied into the bypass duct 8 through the opening and thereby the air quantity to be supplied into the primary combustion zone 9 via the swirler 4 can be arbitrarily adjusted. When the float 12 stops on the stopper 14 of the lower end of the float guide 13, the hole provided in the liner 5 for forming the bypass duct 8 is closed by the lower end of the float 12.

Numeral 15 designates an electromagnetic coil, that floats and moves the float 12 by magnetic force. The electromagnetic coil 15 is provided at a position outside of the combustor case 1 corresponding to the float 12, as shown in FIG. 1. Numeral 16 designates a non-magnetic substance thermal insulator, that is constructed flush with the wall surface of the combustor case 1 on which the electromagnetic coil 15 is provided.

It is to be noted that, while the combustor case 1 is usually made of nickel alloy and the non-magnetic substance thermal insulator 16 is appropriately made of ceramics, it is a matter of course that the materials and the materials components of the combustor case 1 and the non-magnetic substance thermal insulator 16 may be selected optimally in consideration of the operation condition, including the temperature condition, etc.

Figure 2:
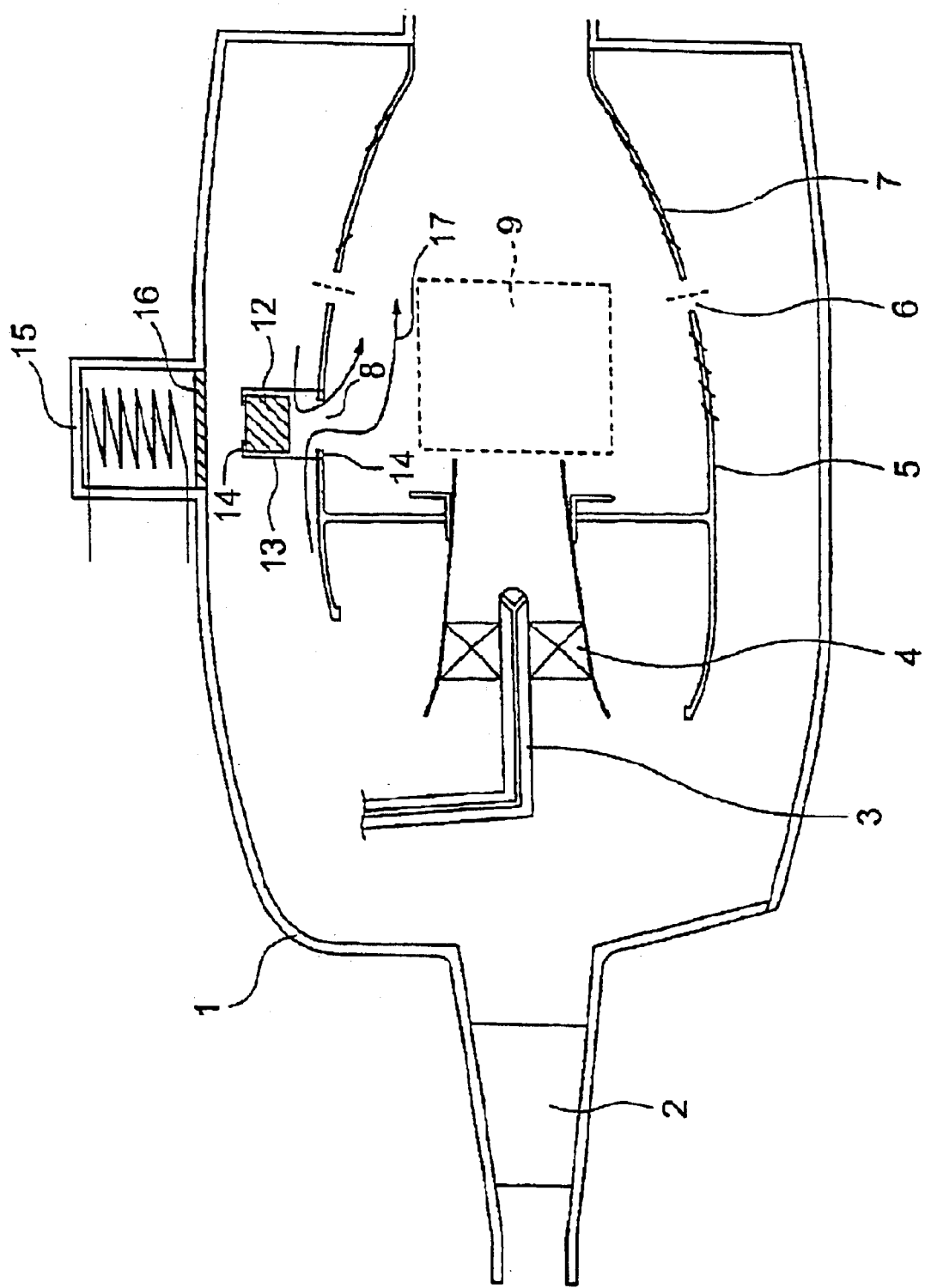
FIG. 2 is an operation explanatory view of the gas turbine combustor of the embodiment shown in FIG. 1.

FIG. 2 is an operation explanatory view showing a state where the float 12 floats to the uppermost end in the gas turbine combustor of the embodiment shown in FIG. 1.

In the gas turbine combustor of the embodiment of FIG. 1, firstly, in a state where the electromagnetic coil 15 is supplied with no electric current, the float 12 abuts and stops on the stopper 14 of the lower end of the float guide 13, as shown in FIG. 1, and no air flows through the bypass duct 8 in this state. This is because the outer pressure of the liner 5 is larger than the inner pressure and, by the differential pressure thereof, the float 12 is pressed radially inwardly of the liner 5.

On the other hand, in FIG. 2, in a state where the electromagnetic coil 15 is supplied with electric current, the float 12 moves corresponding to the electric current until it stops at the position where the force due to the outer and inner differential pressure of the liner 5 and the magnetic force are balanced with each other (FIG. 2 shows the state where the float 12 is at the uppermost end). According to the position of movement of the float 12, air passes through the bypass duct 8 to form a bypass air flow 17 that is not supplied into the primary combustion zone 9 but is led to the combustor outlet. Thereby, the air quantity supplied into the primary combustion zone 9 via the swirler 4 is controlled and a control of the local fuel-air ratio in the primary combustion zone 9 becomes possible.

Figure 4:
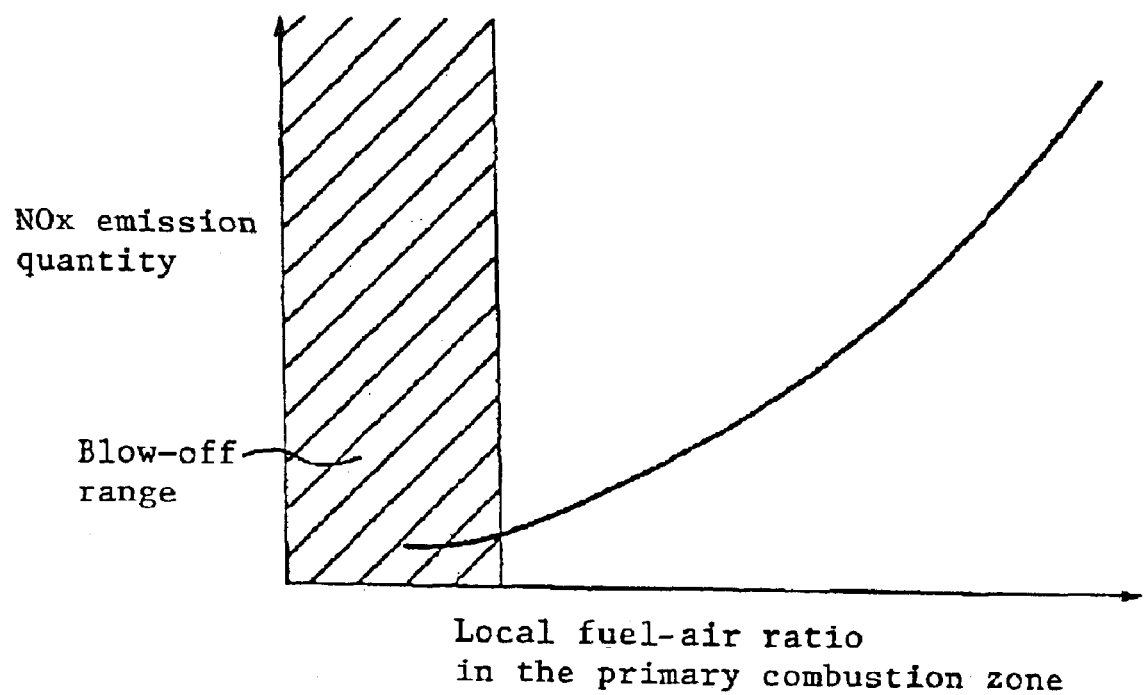
FIG. 4 is a performance curve showing a relation between a local fuel-air ratio in a primary combustion zone and NOx emission quantity.

Thus, as shown in FIG. 4, the local fuel-air ratio in the primary combustion zone 9 is controlled to become low within the range not to cause blow-off of flames and the NOx emission quantity can be effectively reduced.

In the prior art, while the local fuel-air ratio in the primary combustion zone 9 has been controlled by the air quantity control mechanism comprising the bypass duct variable valve 10 and the actuator 11, both having sliding portions, in the embodiment according to the present invention, the mechanism is made such that no sliding portion is provided and air that has passed through the bypass duct 8 is not led to the primary combustion zone 9 but to the combustor outlet to thereby control the air quantity supplied into the primary combustion zone 9 via the swirler 4. Thus, a gas turbine combustor and a combustion control method thereof to appropriately control the local fuel-air ratio in the primary combustion zone are provided.

It is to be noted that the shape, structure, etc. of the bypass duct 8, the float 12, the float guide 13, the stopper 14, the electromagnetic coil 15 are not limited to those of the embodiment as illustrated but they may be appropriately changed or modified in the design according to the gas turbine combustor to which they are applied.

What is claimed is:

1. A gas turbine combustor comprising:
   a liner provided in a combustor case;
   a bypass duct provided in said liner so that air that has passed through said by-pass duct is led to an outlet of said combustor and avoids a primary combustion zone, thereby enabling control of a flow rate of air to be supplied into the primary combustion zone via a swirler;
   a float, made of a magnetic substance, provided in said bypass duct so as to be operable to open and close said bypass duct by a position of movement of said float; and
   an electromagnetic coil provided at a position outside of said combustor case and corresponding to said float so as to be operable to move said float.

2. The gas turbine combustor of claim 1, and further comprising a float guide guiding said float and a stopper on which said float abuts at an inner end of said float guide.

3. A combustion control method of a gas turbine combustor of claim 2, comprising changing a position of movement of said float with said electromagnetic coil so that a portion of air caused to pass through said bypass duct is changed corresponding to the position of movement of said float, thereby controlling the flow rate of air supplied into the primary combustion zone by said swirler to control a local fuel-air ratio in the primary combustion zone.

4. A combustion control method of a gas turbine combustor of claim 1, comprising changing a position of movement of said float with said electromagnetic coil so that a portion of air caused to pass through said bypass duct is changed corresponding to the position of movement of said float, thereby controlling the flow rate of air supplied into the primary combustion zone by said swirler to control a local fuel-air ratio in the primary combustion zone.

5. A gas turbine combustor comprising:

a combustor case having an air diffuser and an outlet;

a liner in said combustor case having an air swirler and a fuel injector operable to form a primary combustion zone therein, and leading to said outlet of said combustor case;

a bypass duct provided in said liner so that air in said combustor case that has passed through said by-pass duct is led to said outlet of said combustor and bypasses the primary combustion zone, thereby enabling control of a flow rate of air to be supplied into the primary combustion zone via said swirler;

a float, made of a magnetic substance, provided in said bypass duct so as to be operable to control an amount of air that passes through said bypass duct by a position of movement of said float; and an electromagnetic coil provided at a position outside of said combustor case and corresponding to said float so as to be operable to move said float to control the amount of air that passes through said bypass duct.

6. The gas turbine combustor of claim 5, and further comprising a float guide guiding said float and a stopper on which said float abuts at an inner end of said float guide.

7. The gas turbine combustor of claim 6, and further comprising a stopper on which said float abuts at an outer end of said float guide.

8. A combustion control method of a gas turbine combustor of claim 5, comprising:

supplying air via said swirler and fuel via said fuel injector to the primary combustion zone at a local fuel-air ratio; and changing a position of movement of said float with said electromagnetic coil so that a part of the air is caused to pass through said bypass duct in correspondence to the position of movement of said float, thereby changing the flow rate of air supplied into the primary combustion zone by said swirler to change the local fuel-air ratio in the primary combustion zone.

* * * * *